United States Patent [19]
Green

[11] 3,853,440
[45] Dec. 10, 1974

[54] ROTARY ENGINE ANTI-SPIN OIL SEAL ARRANGEMENT

[75] Inventor: Raymond J. Green, Northville, Mich.

[73] Assignee: General Motors Corporation, Detroit, Mich.

[22] Filed: Feb. 19, 1974

[21] Appl. No.: 443,216

[52] U.S. Cl. ............................................. 418/142
[51] Int. Cl. .... F01c 19/00, F04c 15/00, F04c 27/00
[58] Field of Search .................................... 418/142,

[56] References Cited
UNITED STATES PATENTS
3,193,188   7/1965   Bentele ............................. 418/142
3,575,541   4/1971   Hamada ............................ 418/142
3,820,925   6/1974   Uchiyama et al. .................. 418/142

FOREIGN PATENTS OR APPLICATIONS
1,233,198   1/1967   Germany ........................... 418/142

Primary Examiner—John J. Vrablik
Attorney, Agent, or Firm—Ronald L. Phillips

[57] ABSTRACT

A rotary engine anti-spin oil seal arrangement has an anti-spin clip that is spring clamped and also retained by barbs on the oil seal and has a lock tab that projects from an unsealed radially facing side of the oil seal and catches in a lock groove in the radially oppositely facing wall of the oil seal groove in the rotor to prevent the oil seal from spinning in the oil seal groove without interfering with the normal sealing action.

2 Claims, 5 Drawing Figures

ROTARY ENGINE ANTI-SPIN OIL SEAL ARRANGEMENT

This invention relates to a rotary engine anti-spin oil seal arrangement and more particularly to such an arrangement employing a simple clip with a lock tab.

In the presently commercial rotary engine having a two-lobe internal peripheral wall and a three-lobe planetary rotor, a pair of circular oil seals are mounted in each side of the rotor and are biased by wave springs to sealingly engage stationary side walls. In addition, sealing between each oil seal and the rotor is provided by an elastomeric O-ring which is mounted in an annular groove in either the inwardly or outwardly facing side of the oil seal and sealingly engages the oppositely facing wall of the oil seal groove. It has been found that without some preventative provision the oil seals can spin in their grooves during engine operation with the undesirable result that there will occur relative rotation either between the oil seal and the O-ring or between the O-ring and the wall of the groove that it engages. In either event, this spinning abrades the elastomeric O-ring and thus impairs its sealing effectiveness. Thus, it is desirable that the oil seals be prevented from spinning in their oil seal grooves. However, any such anti-spin device should not interfere with the normal sealing action and yet be simple and inexpensive.

An object of the present invention is to provide a new and improved rotary engine anti-spin oil seal arrangement.

Another object is to provide a rotary engine anti-spin oil seal arrangement having a simple spring clip that readily secures to and is retained on the oil seal and has a lock tab that catches in a lock groove in an unsealed wall of the oil seal groove in the rotor to prevent the oil seal from turning in the oil seal groove while permitting normal oil seal movement.

Another object is to provide a rotary engine oil seal arrangement having an anti-spin clip that is clamped to and retained by barbs on the oil seal and has a lock tab that projects from an unsealed side of the oil seal but does not interfere with an elastomeric seal mounted in a groove in a sealed side of the oil seal and catches on oil seal installation in a lock groove in the oppositely facing wall of the oil seal groove in the rotor to prevent the oil seal from spinning in the oil seal groove while permitting normal movement of the oil seal.

These and other objects of the present invention will be more apparent from the following description and drawing in which.

Figures 1, 2, 3, 4, 5:
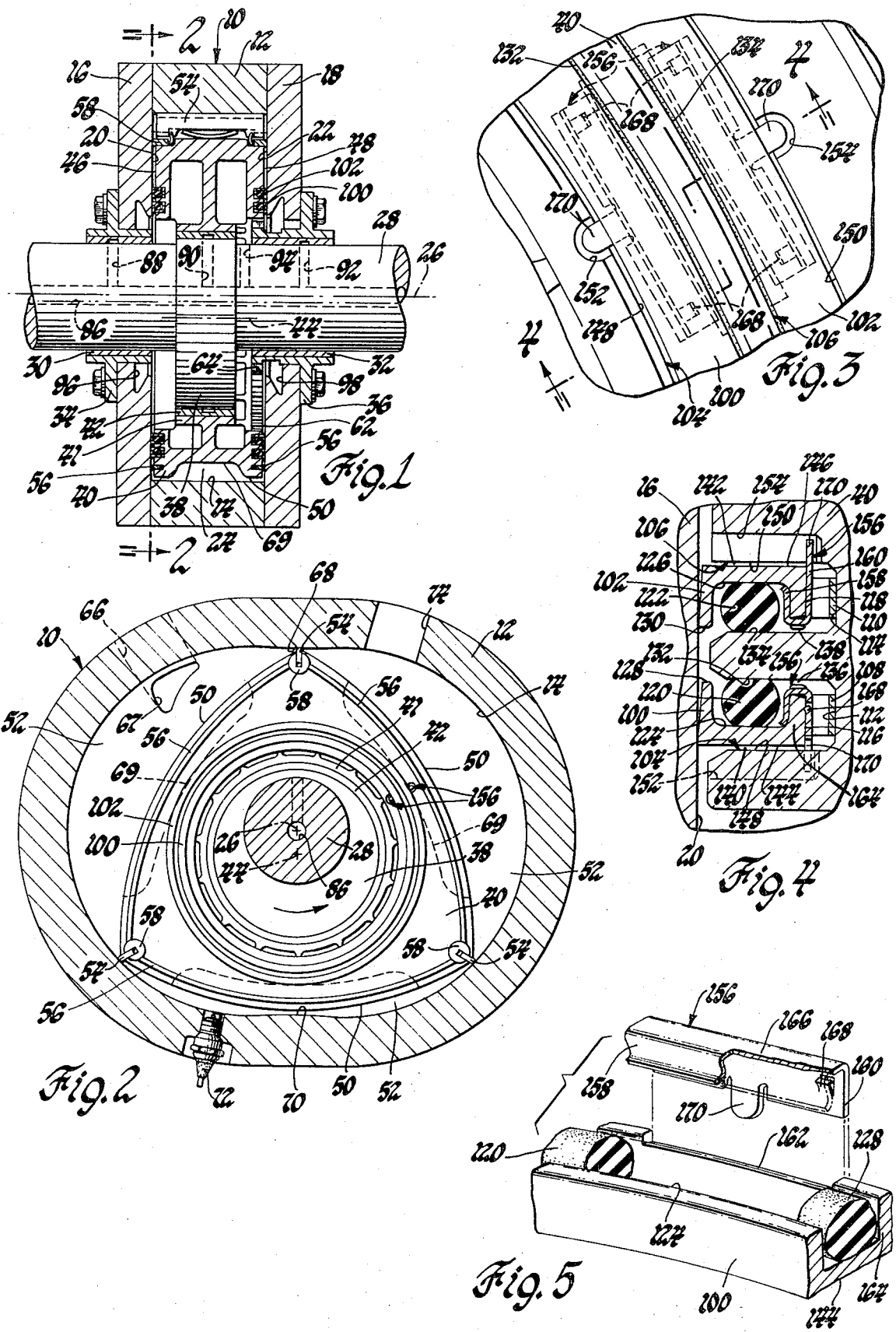
FIG. 1 is a longitudinal view with parts in section of a rotary engine having anti-spin oil seal arrangements constructed according to the present invention.
FIG. 2 is a view taken along the line 2—2 in FIG. 1 showing one rotor side.
FIG. 3 is an enlarged view of the anti-spin oil seal arrangements as shown in FIG. 2.
FIG. 4 is a view taken along the line 4—4 in FIG. 3.
FIG. 5 is an exploded view with parts broken away showing the lock tab arrangement.

The present invention is for use in a rotary combustion engine of the planetary type shown in FIGS. 1 and 2. The engine comprises a housing 10 which in a single rotor arrangement, as shown, has basically three parts; namely, a rotor housing 12 having an inwardly facing inner peripheral wall 14 and a pair of side housings 16 and 18 having parallel, oppositely facing, spaced inner side walls 20 and 22, respectively. The housing parts are secured together by bolts, not shown, and the inner housing walls 14, 20 and 22 cooperatively provide a cavity 24. As shown in FIG. 2, the peripheral wall 14 is a two-lobe curve with a center line indicated at 26. A crankshaft 28 extends through the cavity and is rotatably supported in sleeve bearings 30 and 32 which are secured in collars 34 and 36 that are bolted to the side housings 16 and 18, as shown in FIG. 1, the crankshaft axis being coincident with the center line 26, parallel to the peripheral wall 14 and at right angles to the side walls 20 and 22. The crankshaft 28 is provided in cavity 24 with an eccentric 38. A three-lobe rotor 40 has a hub 41 having a sleeve bearing 42 secured therein which is received on the eccentric 38 so that the rotor is thereby supported in cavity 24 for rotation about the eccentric's center line 44 which is thus the rotor's axis.

The rotor 40 has the general shape of an arcuate sided triangle with two parallel sides 46 and 48 at right angles to the rotor axis which face and run close to the side walls 20 and 22, respectively, and an outer peripheral wall having three arcuate outer faces 50 which face the peripheral wall 14 and cooperate therewith and with the side walls 20 and 22 to define three variable volume working chambers 52. Sealing of these chambers is effected by gas sealing means comprising three apex seals 54 which are each mounted in an axially extending groove or slot at each apex or corner of the rotor 40 and extend the width thereof. Three arcuate side seals 56 are mounted in accommodating grooves in each rotor side and extend adjacent the rotor faces between two of the apex seals 54. Three cylindrical corner seals 58 are mounted in cylindrical blind bores in each rotor side contiguous with the apex seal slots with each corner seal having a slot receiving one end of an apex seal and providing sealing between the ends of two side seals and one apex seal as shown in FIG. 2. The apex seals 54 are spring biased to engage the peripheral wall 14 and both the side seals 56 and the corner seals 58 are spring biased to engage the respective side walls 20 and 22 with the complete gas seal arrangement acting to seal the working chambers.

With the two-lobe peripheral wall 14 and the three-lobe rotor 40, each of the working chambers 52 sequentially expands and contracts between minimum and maximum volume twice during each revolution while the rotor apexes closely follow the peripheral wall by forcing the rotor to rotate at one-third the speed of the crankshaft. This is accomplished by gearing comprising an internal tooth gear 62 which is formed integral with the right-hand side 48 of the rotor with its center on the rotor axis as shown in FIG. 1. The gear 62 meshes with an external tooth annular gear 64 which is freely received about and is concentric with the crankshaft 28 and is made stationary by being formed integral with the left-hand end of the right-hand collar 36. The gear 62 has one and one-half times the number of teeth as the gear 64 to provide the required speed ratio of 3:1 between the crankshaft and the rotor.

A combustible air-fuel mixture from a suitable carburetor arrangement, not shown, is made available to each working chamber 52 by an intake passage 66 as shown in FIG. 2. Intake passage 66 extends through the engine housing and opens to the cavity through either the peripheral wall 14 or through aligned side wall ports 67, only one of which is shown, or through a combination thereof with such porting being located on the leading side of cusp 68 of the peripheral wall relative to the direction of rotor rotation indicated by the arrow in FIG. 2. Thus, the rotor sides uncover the intake ports to the chambers as they are expanding in the intake phase to draw in the combustible mixture and then closes this intake opening to them when they are contracting to compress the mixture in the following compression phase. A single channel or recess 69 is provided in the center of each chamber face of the rotor so that when each rotor face is at or near its top-dead-center position with its center opposite the peripheral wall's other cusp 70, the associated chamber is not then divided by this cusp. A spark plug 72 is mounted in the rotor housing 12 adjacent the cusp 70 with its electrodes exposed to the passing working chambers and is supplied with voltage from a suitable ignition system, not shown, at the proper time at or near top-dead-center to initiate combustion at the end of the compression phase. On combustion the peripheral wall 14 takes the reaction forcing the rotor to continue rotating while the gas is expanding in the expansion or power phase. The leading apex seal 54 of the working chambers eventually traverses an exhaust passage 74 in the rotor housing on the trailing side of the cusp 68 whereby the exhaust products are then expelled in the exhaust phase to complete the cycle.

Describing now the lubrication and also the cooling of the rotor that is normally provided in such an arrangement, oil from the engine drains to a sump from which it is delivered by a suitable engine powered pump, not shown, to a central axial oil passage 86 in the crankshaft 28 as shown in FIG. 1. Radial oil passages 88, 90 and 92 deliver oil from the passage 86 to lubricate the sleeve bearings 30, 42 and 32, respectively. The rotor 40 has a hollow interior and is webbed for rigidity and a radial oil passage 94 in the crankshaft 28 delivers oil from the passage 86 to lubricate the gears 62 and 64 and also to the rotor's interior for cooling of the rotor with the oil carrying the heat from the rotor by passing to annular cavities 96 and 98 in the respective side walls 20 and 22 that are connected by passages, not shown, to drain to the sump. In addition to the gas seals carried on the rotor 40, there is provided in each side of the rotor inner and outer circular oil seals 100 and 102 of metal that are located radially inwardly of the side seals 56 in accommodating axially outwardly facing circular grooves 104 and 106, respectively, that are centered on the rotor axis 44. best shown in FIG. 4, the oil seals 100 and 102 in each rotor side are biased to engage the oppositely facing housing side wall to prevent the oil supplied for lubrication and cooling from reaching the radially outwardly located gas seals by split annular wave springs 108 and 110 that engage on one spring side with the oil seal grooves' planar bottoms 112 and 114 and on the other spring side with the oil seals' planar backsides 116 and 118, respectively. In addition, sealing is provided between the oil seals 100 and 102 and the rotor by elastomeric O-rings 120 and 122 which are mounted in annular grooves 124 and 126 in the radially outwardly and inwardly facing sides 128 and 130 of the respective oil seals 100 and 102, these grooves being rectangular in cross-section. The O-ring groove 124 in the inner oil seal 100 faces radially outwardly with the O-ring 120 engaging the oppositely radially facing wall 132 of the oil seal groove 104. Conversely, the O-ring groove 126 in the outer oil seal 102 faces radially inwardly with the O-ring 122 engaging the oppositely radially facing wall 134 of the oil seal groove 106. Thus, the O-rings 120 and 122 seal the respective radial clearances 136 and 138 between the oil seals 100 and 102 and the oil seal groove walls 132 and 134 while the radial clearances 140 and 142 between the other radially facing oil seal sides 144 and 146 and oil seal groove walls 148 and 150 are left open. Thus, in the case of the inner oil seal 100, oil can pass through the clearance 140 on this unsealed oil seal side but is trapped in the chamber behind this oil seal by the O-ring sealed oil seal side so that with centrifugal action there is developed oil pressure to assist the spring bias on this oil seal.

The structure thus far described is conventional and without some anti-spin provision the oil seals can spin in their grooves causing impairment of the sealing effectiveness of the O-rings. Such adverse effect is positively prevented by the present invention with only a simple lock tab and simple modifications to the oil seals and oil seal grooves which do not adversely affect the normal sealing action. To prevent oil seal spin, there are provided cylindrical lock grooves 152 and 154 which are drilled in the unsealed walls 148 and 150 of the oil seal grooves 104 and 106 parallel to the groove center line 44 as shown in FIGS. 3 and 4. The lock grooves 152 and 154 extend almost to the bottoms 112 and 114 of the oil seal grooves 104 and 106, as shown in FIG. 4, and each freely receive an anti-spin clip 156 that is secured to each of the respective oil seals 100 and 102. Each of the anti-spin clips 156 is formed of sheet metal and has a simple U-shape, as best shown in FIG. 4, with a short inner leg 158 and a long outer leg 160 that are parallel and form a clamp. In the case of the inner oil seal 100, a notch 162 is machined in the radially outwardly facing side 128 of the oil seal's backside wall 164 to more than fully accommodate the base 166 that joins the clip legs 158 and 160. The space between the clip legs 158 and 160 in their relaxed state is slightly less than the thickness of the oil seal's backside wall 164 so that this wall is clamped by the legs to secure the clip thereto. In addition, a pair of tangs or barbs 168 are pierced from the long leg 160 to project from the inner side thereof and in a direction opposite the direction of clip assembly so that they dig into the oil seal's backside 116 to resist dislodging of the clip. The long leg 160 also has a centrally located lock tab 170 that projects in the plane thereof radially inwardly past the unsealed oil seal side 144. With the anti-spin clip 156 secured to the oil seal 100, the O-ring 120 may be inserted in the O-ring groove 124 in the normal manner since the short leg 158 of the clip hugs the backside wall 164 so as to not interfere therewith. The oil seal 100 is then inserted in the oil seal groove 104 in the rotor with the lock tab 170 fitting in the lock groove 152 on the unsealed side of the oil seal. The lock groove 152 captures the lock tab 170 to prevent the oil seal 100 from spinning in the oil seal groove 104 but because of the lock groove alignment with the normal direction of seal movement permits the lock tab to move therealong so that the oil seal 100 remains free to move axially to maintain sealing engagement with the housing side wall. Since the lock tab 170 is located in a most rearward location, there is no reasonable possibility that it will leave the lock groove during the life of the oil seal. Thus, the anti-spin clip 156 does not interfere with the normal sealing action of either the O-ring 120 or the oil seal 100. Similar locking without seal interference is provided for the outer oil seal 102 as shown in FIGS. 2, 3 and 4, recognizing that in this case the unsealed side of the outer oil seal 102 is the radially outwardly facing side 146 and that the associated lock tab 170 projects from this oil seal side to engage the lock groove 154 in the unsealed wall 150 of the outer oil seal groove 106.

The above described embodiment is illustrative of the invention which may be modified within the scope of the appended claims.

I claim:

1. A rotary engine having a housing with an inwardly facing peripheral wall and oppositely facing inner side walls cooperatively defining a cavity, a crankshaft rotatably supported in said housing, said crankshaft having an eccentric located in said cavity, a rotor rotatably mounted on said eccentric in said cavity, said rotor having sides facing said side walls and peripheral faces facing said peripheral wall defining a plurality of chambers that are spaced about and move with said rotor while varying in volume as said rotor rotates, a circular oil seal groove in each side of said rotor with its center on the rotor axis, a circular oil seal in each said oil seal groove axially movable to sealingly engage the opposing side wall, said oil seal having a backside and oppositely radially facing sides, said oil seal groove having a bottom and oppositely radially facing walls, a wave spring mounted in said oil seal groove engaging said groove bottom and said oil seal backside for biasing said oil seal to normally move axially in said oil seal groove to sealingly engage the opposite housing side wall, an elastomeric seal groove in one of said radially facing sides of said oil seal, said elastomeric seal groove having a radially facing bottom opposite one of the walls of said oil seal groove and radially extending oppositely facing sides, an elastomeric seal mounted in said elastomeric seal groove in said oil seal and engaging the bottom of said elastomeric seal groove and the oppositely radially facing said one wall of said oil seal groove to provide sealing between said oil seal and said rotor while said oil seal sealingly engages the housing side wall, said oil seal having a backside wall between said elastomeric seal groove and said backside, said backside wall having a notch in the sealed radially facing side of said oil seal, an anti-spin clip having a pair of legs clamping said backside wall and a base that joins said legs fully received in said notch, said anti-spin clip further having a lock tab depending from the leg on said backside of said oil seal and projecting radially past the unsealed other radially facing side of said oil seal, and a lock groove in the unsealed wall of said oil seal groove in said rotor aligned with the normal direction of oil seal movement for receiving said lock tab to prevent said oil seal from spinning in said oil seal groove while permitting said anti-spin clip to move with said oil seal in the normal direction in said oil seal groove so that said oil seal remains free to move axially to maintain sealing engagement with the opposite housing side wall.

2. A rotary engine having a housing with an inwardly facing peripheral wall and oppositely facing inner side walls cooperatively defining a cavity, a crankshaft rotatably supported in said housing, said crankshaft having an eccentric located in said cavity, a rotor rotatably mounted on said eccentric in said cavity, said rotor having sides facing said side walls and peripheral faces facing said peripheral wall defining a plurality of chambers that are spaced about and move with said rotor while varying in volume as said rotor rotates, a circular oil seal groove in each side of said rotor with its center on the rotor axis, a circular oil seal in each said oil seal groove axially movable to sealingly engage the opposing side wall, said oil seal having a backside and oppositely radially facing sides, said oil seal groove having a bottom and oppositely radially facing walls, a wave spring mounted in said oil seal groove engaging said groove bottom and said oil seal backside for biasing said oil seal to normally move axially in said oil seal groove to sealingly engage the opposite housing side wall, an elastomeric seal groove in one of said radially facing sides of said oil seal, said elastomeric seal groove having a radially facing bottom opposite one of the walls of said oil seal groove and radially extending oppositely facing sides, an elastomeric seal mounted in said elastomeric seal groove in said oil seal and engaging the bottom of said elastomeric seal groove and the oppositely radially facing said one wall of said oil seal groove to provide sealing between said oil seal and said rotor while said oil seal sealingly engages the housing side wall, said oil seal having a backside wall between said elastomeric seal groove and said backside, said backside wall having a notch in the sealed radially facing side of said oil seal, an anti-spin clip having a pair of legs clamping said backside wall and a base that joins said legs fully received in said notch, said anti-spin clip further having a lock tab depending from the leg on said backside of said oil seal and projecting radially past the unsealed other radially facing side of said oil seal, the leg on said backside of said oil seal also having a barb for digging into said backside to assist the clamping action of said legs in preventing dislodging of said anti-spin clip from said oil seal, and a lock groove in the unsealed wall of said oil seal groove in said rotor aligned with the normal direction of oil seal movement for receiving said lock tab to prevent said oil seal from spinning in said oil seal groove while permitting said anti-spin clip to move with said oil seal in the normal direction in said oil seal groove so that said oil seal remains free to move axially to maintain sealing engagement with the opposite housing side wall.

* * * * *